(12) United States Patent
Meyer et al.

(10) Patent No.: US 10,294,553 B2
(45) Date of Patent: May 21, 2019

(54) METHOD OF ANNEALING ALUMINIUM ALLOY SHEET MATERIAL

(71) Applicant: ALERIS ALUMINUM DUFFEL BVBA, Duffel (BE)

(72) Inventors: Philippe Meyer, Koblenz (DE); Svetlana Emirovna Ebzeeva, Duffel (BE); Johan Petrus Mariette Guido Arras, Duffel (BE); Dirk Medard Gerard Florent Van Nieuwerburgh, Duffel (BE); Petra Backx, Duffel (BE)

(73) Assignee: ALERIS ALUMINUM DUFFEL BVBA, Duffel (BE)

( * ) Notice: Subject to any disclaimer, the term of this patent is extended or adjusted under 35 U.S.C. 154(b) by 326 days.

(21) Appl. No.: 15/509,736

(22) PCT Filed: Sep. 3, 2015

(86) PCT No.: PCT/EP2015/070123
§ 371 (c)(1),
(2) Date: Mar. 8, 2017

(87) PCT Pub. No.: WO2016/037922
PCT Pub. Date: Mar. 17, 2016

(65) Prior Publication Data
US 2017/0253953 A1    Sep. 7, 2017

(30) Foreign Application Priority Data
Sep. 12, 2014   (EP) ..................................... 14184553

(51) Int. Cl.
*C22F 1/047*    (2006.01)
*C22C 21/08*    (2006.01)
(Continued)

(52) U.S. Cl.
CPC .................. *C22F 1/04* (2013.01); *C21D 1/42* (2013.01); *C21D 1/52* (2013.01); *C21D 9/0056* (2013.01);
(Continued)

(58) Field of Classification Search
CPC .. C22F 1/043; C22F 1/047; C22F 1/05; C22C 21/02; C22C 21/06; C22C 21/08
See application file for complete search history.

(56) References Cited

U.S. PATENT DOCUMENTS

| 4,897,124 A | 1/1990 | Matsuo et al. |
| 5,480,498 A | 1/1996 | Beaudoin et al. |

(Continued)

FOREIGN PATENT DOCUMENTS

| CN | 201785465 U | 4/2011 |
| EP | 1702995 A1 | 9/2006 |

(Continued)

OTHER PUBLICATIONS

International Search Report and Written Opinion dated Dec. 10, 2015 for PCT/EP2015/070123 to Aleris Aluminum Duffel BVBA filed Sep. 3, 2015.

*Primary Examiner* — Lois L Zheng
(74) *Attorney, Agent, or Firm* — Vorys, Sater, Seymour and Pease LLP

(57) ABSTRACT

A method for continuously annealing aluminum alloy sheet at final thickness by continuously moving heat-treatable AlMgSi aluminum alloy sheet through a continuous annealing furnace arranged to heat the moving aluminum sheet to a set soaking temperature ($T_{SET}$) in the temperature range of 500° C. to 590° C., the continuous annealing furnace has an entry section and an exit section, the moving aluminum sheet moves substantially horizontally through the continuous annealing furnace, wherein the moving aluminum sheet (Continued)

is rapidly cooled on leaving the exit section, wherein before or near the entry section of the continuous annealing furnace the moving aluminum sheet is pre-heated to a temperature of 5° C. to 100° C. below the $T_{SET}$ using an average heat-up rate as function of sheet thickness of at least $Y=-31 \cdot \ln(X)+50$, wherein Y is the heat-up rate in ° C./sec and X is the sheet thickness in mm.

22 Claims, 4 Drawing Sheets

(51) Int. Cl.
| | | |
|---|---|---|
| | *C22F 1/05* | (2006.01) |
| | *C22F 1/04* | (2006.01) |
| | *C21D 9/00* | (2006.01) |
| | *C21D 1/42* | (2006.01) |
| | *C21D 1/52* | (2006.01) |
| | *C23C 22/73* | (2006.01) |
| | *C23C 22/78* | (2006.01) |
| | *C22C 21/02* | (2006.01) |
| | *C22C 21/06* | (2006.01) |

(52) U.S. Cl.
CPC .............. *C21D 9/0062* (2013.01); *C22F 1/05* (2013.01); *C23C 22/73* (2013.01); *C23C 22/78* (2013.01); *Y02P 10/253* (2015.11)

(56) References Cited

U.S. PATENT DOCUMENTS

| | | |
|---|---|---|
| 5,739,506 A | 4/1998 | Hanton et al. |
| 6,120,623 A | 9/2000 | Gupta et al. |
| 2007/0209739 A1* | 9/2007 | Zhao .................. B22D 11/0605 148/551 |

FOREIGN PATENT DOCUMENTS

| | | |
|---|---|---|
| JP | H07286251 A | 10/1995 |
| JP | H10-298668 A | 11/1998 |
| JP | H1161277 A | 3/1999 |
| JP | 2000226629 A | 8/2000 |
| JP | 2004043938 A | 2/2004 |
| JP | 2007031819 A | 2/2007 |
| JP | 2011179035 A | 9/2011 |
| JP | 2014122390 A | 7/2014 |
| WO | 9814626 A1 | 4/1998 |

* cited by examiner

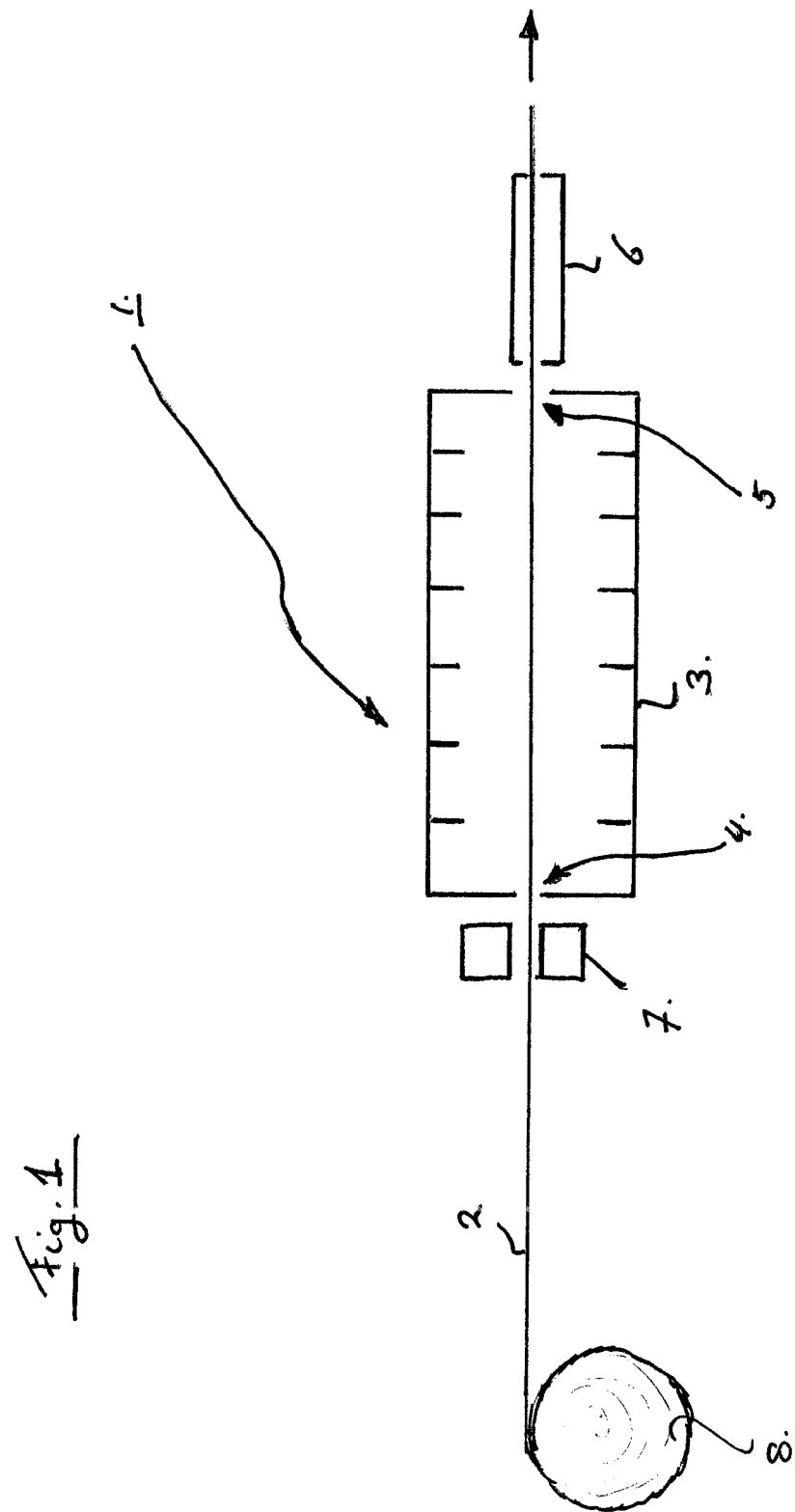

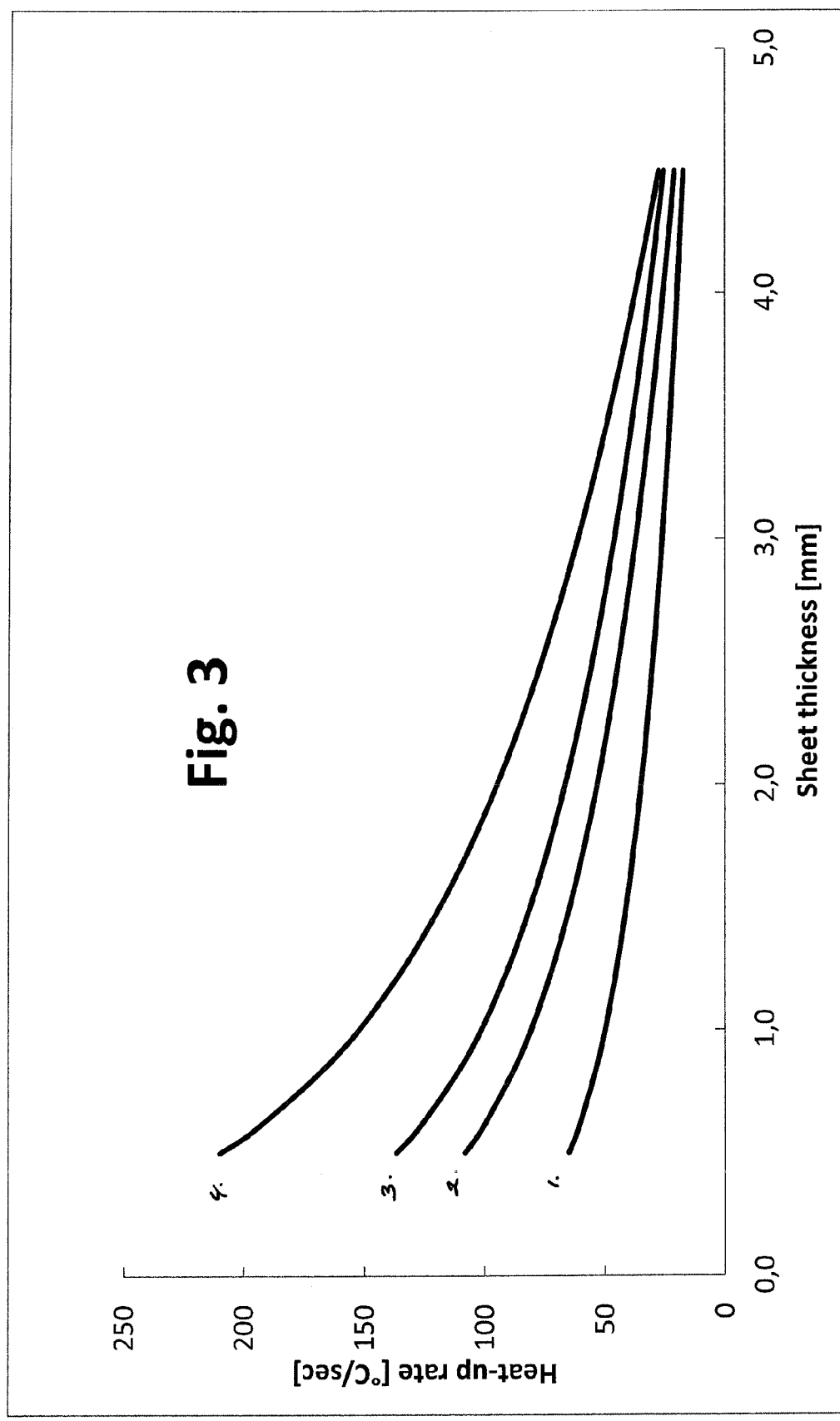

METHOD OF ANNEALING ALUMINIUM ALLOY SHEET MATERIAL

CROSS-REFERENCE TO RELATED APPLICATIONS

This is a § 371 National Stage Application of International Application No. PCT/EP2015/070123 filed on Sep. 3, 2015, claiming the priority of European Patent Application No. 14184553.7 filed on Sep. 12, 2014.

FIELD OF THE INVENTION

The invention relates to a method for continuously annealing heat-treatable aluminium AlMgSi-series or AA6000-series alloy sheet at final thickness by continuously moving uncoiled aluminium alloy sheet in the direction of its length through a continuous annealing furnace arranged to heat the moving aluminium sheet to a solution heat treatment temperature or soaking temperature in the of 500° C. to 590° C. Furthermore, the invention relates to an apparatus for implementing the method according to this invention.

BACKGROUND TO THE INVENTION

As will be appreciated herein below, except as otherwise indicated, aluminium alloy designations and temper designations refer to the Aluminum Association designations in Aluminum Standards and Data and the Registration Records, as published by the Aluminum Association in 2014 and well known to the persons skilled in the art.

The industrial scale automotive sheet production of the heat-treatable AlMgSi-alloy series, also known as 6000-series aluminium alloys, typical examples include AA6005, AA6014, AA6016 and AA6022, comprises several discrete steps, namely semi-continuous direct chill (DC)-casting or electromagnetic casting (EMC-casting) of a rolling slab or ingot, although on a less preferred basis also continuous casting like belt or roll casting can be applied, preheating of the slab at about 500° C. to 580° C. for several hours for homogenization of the microstructure, hot rolling into hot rolled strip at a gauge of about 3 to 12 mm, the hot rolled strip is typically hot coiled and cooled down to ambient temperature, the hot rolled strip is cold rolled to final gauge in several passes, optionally an intermediate anneal is applied prior to the cold rolling or during the cold rolling process, and at final gauge the strip is annealed to adjust the required material properties. The annealing can be done either in a continuous annealing furnace or in a batch type furnace.

Unfortunately, sheet products produced in this way from semi-continuous cast ingots often suffer from a phenomenon known as roping, ridging or "paint brush" line formation (the term "roping" is used henceforth), i.e. the formation of narrow bands having a different crystallographic structure than the remaining metal resulting from the metal rolling operation and generally aligned in the direction of rolling. During subsequent transverse straining of the sheet products as they are being formed into automotive parts, these bands manifest themselves as visible surface undulations, which detract from the final surface finish of the automotive product.

Roping has been encountered by many others in this art, and it has been found that roping may be inhibited by modifying the sheet production method so that recrystallisation occurs at an intermediate stage of processing. The inhibition of roping is addressed, for example, in U.S. Pat. No. 5,480,498 (Reynolds), U.S. Pat. No. 4,897,124 (Sky Aluminum), and also in U.S. Pat. No. 6,120,623 (Alcan). In these patents, roping is controlled by introducing a batch annealing step (e.g. heating at a temperature within the range of 316° C. to 538° C.) at an intermediate stage of the sheet product formation, e.g. after hot rolling but before cold rolling, or after an early stage of cold rolling.

An economical attractive method of producing 6000-series aluminium sheet material is by means of continuous annealing at final gauge. At the end of a continuous annealing furnace, the strip material is rapidly cooled or quenched to ambient temperature, for example by means of forced air cooling or spray cooling systems. By this solution anneal the main alloying elements Mg and Si are dissolved, leading to a good formability, control of the yield strength and bake hardening behaviour, and brings the sheet material to a T4 temper.

In order to produce AlMgSi-alloy sheet material on an industrial scale in an economical attractive manner, it is required that sufficiently high line speeds can be maintained while the sheet material is moving through the continuous annealing furnace. However, too high line speeds may impact on the soaking time of the strip material at the required annealing temperature and thereby affecting, amongst others, the mechanical properties of the aluminium strip.

There is consequently a need for an improved process of producing aluminium automotive alloy sheet products that exhibit little or no roping while maintaining desirable T4 characteristics.

DESCRIPTION OF THE INVENTION

It is an object of the invention to provide a method for continuously annealing AlMgSi aluminium alloy sheet at final thickness having a good roping behaviour in combination with good mechanical properties.

This and other objects and further advantages are met or exceeded by the present invention providing a method for continuously annealing aluminium alloy sheet at final thickness by continuously moving uncoiled heat-treatable AlMgSi aluminium alloy sheet in the direction of its length through a continuous annealing furnace arranged to heat the moving aluminium sheet to a set solution heat treatment temperature or set soaking temperature ($T_{SET}$) in the temperature range of about 500° C. to 590° C., more preferably of about 520° C. to 580° C., the continuous annealing furnace has an entry section and an exit section, the moving aluminium sheet moves from to entry section to the exit section substantially horizontally through the continuous annealing furnace, the continuous annealing furnace is heated by means of convective heating means, preferably gas firing means, e.g. multiple combustion burners and air circulations devices, and wherein the moving aluminium sheet is rapidly cooled or quenched from $T_{SET}$ to below about 100° C., typically to ambient temperature, after leaving the exit section, and wherein immediately before or near the entry section of the continuous annealing furnace the moving aluminium sheet is pre-heated from ambient temperature to a temperature of about 5° C. to 100° C. below the $T_{SET}$ with an average heat-up rate as function of the sheet thickness of at least $Y=-31 \cdot \ln(X)+50$, wherein Y is the average heat-up rate in ° C./sec and X is the sheet thickness in mm.

In a conventional continuous solution heat treatment process, the resultant AlMgSi aluminium sheet has a good roping performance, but it has to be processed at relative low line speeds if also good mechanical properties are required. In accordance with the invention, it has been found that at least for roping critical AlMgSi alloys an improved balance is achieved in maintaining a good roping performance combined with improved mechanical properties in the T4 condition (e.g. yield strength, tensile strength) while simultaneously being manufactured via an economical more attractive manufacturing process due to the higher permitted line speeds. For AlMgSi alloys for which the crash performance is a very critical material property, e.g. AA6005 and AA6005A series alloys, it has been found that an improved crash performance is obtained when produced in accordance with the invention.

In a preferred embodiment, the moving aluminium sheet is very rapidly pre-heated from ambient temperature to a temperature in a range of up to 75° C. below the $T_{SET}$, and more preferably to a temperature in a range of up to 60° C. below the $T_{SET}$. In an embodiment, the moving aluminium sheet is very rapidly pre-heated from ambient temperature to a temperature up to about 10° C. below the $T_{SET}$.

Although various convective heating means can be applied, e.g. resistance heating, the continuous annealing furnace is preferably heated by convection heating using a gas firing devices with multiple air circulation devices and the state-of-the-art furnaces have temperature control means to control the set solution heat treatment temperature with a control accuracy of +/−3° C. or better.

In an embodiment, the aluminium alloy sheet is being pre-heated inductively by means of induction heating, and more by means of a transverse flux induction heating device. This enables a very rapid pre-heating before the moving aluminium sheet is further heated by means of convective heating in the continuous annealing furnace to $T_{SOAK}$.

In an embodiment, the pre-heating is with an average heat-up rate as function of the sheet thickness of at least $Y=-50 \cdot \ln(X)+80$, wherein Y is the average cooling rate in ° C./sec and X is the sheet thickness in mm. A preferred average heat-up rate as function of the sheet thickness of at least $Y=-62 \cdot \ln(X)+100$. A more preferred average heat-up rate as function of the sheet thickness of at least $Y=-93 \cdot \ln(X)+150$. A higher heat-up rate is beneficial for various properties of the resultant aluminium sheet and is also favourable for the balance in sheet properties and allowable increased line speeds.

In an embodiment, the aluminium alloy sheet at final gauge has a thickness in the range of 0.3 to 4.5 mm, more preferably of 0.7 to 4.5 mm. The sheet width is typically in the range of about 700 to 2700 mm.

In an embodiment, the moving aluminium sheet moves substantially horizontally through the continuous annealing furnace over a length of at least about 20 meters, preferably at least 40 meters, and more preferably of at least about 55 meters. A practical maximum length is about 125 meters, but the invention is not limited to this maximum length.

In an embodiment, the soaking time of the moving aluminium sheet at $T_{SET}$ is at least 1 second and preferably at least 5 seconds. In a further embodiment, the soaking time of the moving aluminium sheet at $T_{SET}$ is at least 20 seconds, and more preferably at least 25 seconds. The soaking time ($t_{SOAK}$) is defined at the time spent at the set solution heat treatment temperature or set soaking temperature ($T_{SOAK}$) ±5° C.; for example, when the $T_{SOAK}$ is 560° C. it concerns the time the moving aluminium sheet is at the temperature of 560±5° C.

In a further embodiment of the method, the quenched and moving aluminium sheet is stretched up to about 2%, typically in a range of about 0.1% to 0.3%, by means of tension levelling. More preferably, the stretched and moving aluminium sheet is subsequently cleaned and provided with a passivation coating.

In a further embodiment, the stretched aluminium sheet having a passivation coating is heat-treated in a pre-bake heat treatment. The pre-bake treatment increases in particular the paint-bake response of the aluminium sheet material.

In another aspect of the invention, there is provided an apparatus for implementing the method according to the invention, the apparatus comprising a continuous annealing furnace, in particular a convection floating furnace, arranged to heat treat uncoiled and moving aluminium sheet at final gauge at a set solution heat treatment temperature or set soaking temperature ($T_{SET}$) in a temperature range of 450° C. to 590° C. by means of convective heating, e.g. using gas firing devices, and whereby the moving aluminium sheet is able to move substantially horizontally in a floating arrangement, typically over a distance of at least about 20 meters, preferably over at least about 40 meters, and more preferably over at least 55 meters, the continuous annealing furnace has an entry section and an exit section, and wherein in addition to the convective heating means, e.g. gas firing means, for heating the annealing furnace to $T_{SET}$ there is provided immediately near the entry section of the continuous annealing furnace a pre-heating device enabling an average heat-up rate as function of the sheet thickness of at least $Y=-31 \cdot \ln(X)+50$, and with preferred higher heat-up rates, wherein Y is the heat-up rate in ° C./sec and X is the sheet thickness in mm, in the moving aluminium sheet from ambient temperature to a temperature of 5° C. to 100° C., and preferably of 5° C. to 75° C., below $T_{SET}$. A good practice is to target 10° C. below $T_{SET}$.

In a preferred embodiment, the pre-heating device or pre-heating means comprise an induction heating means or an induction heating device. More preferably, the inductive heating means include a transverse flux induction heating device.

The invention has been explained by reference to heat-treatable aluminium alloys of the 6000-series which are typically solution heat treated at final gauge at a temperature range of 500° C. to 590° C. However, the apparatus itself can be applied also to a broader range of heat-treatable aluminium alloys to be annealed or solution heat treated and requiring depending on the actual alloy composition lower solution heat treatment temperatures, e.g. 460° C. or 480° C., while achieving further improvements in the aluminium sheets.

In a further aspect of the invention, there is provided a kit-of-parts for implementing the method according to the invention, and comprising a continuous annealing furnace, in particular a convection floating furnace, arranged to heat treat uncoiled and moving aluminium sheet at final gauge at a set solution heat treatment temperature or set soaking temperature ($T_{SET}$) in a temperature range of 450° C. to 590° C. by means of convective heating, e.g. using gas firing devices, and whereby the moving aluminium sheet is able to move substantially horizontally in a floating arrangement, typically over a distance of at least about 20 meters, preferably over at least about 40 meters, and more preferably over at least 55 meters, the continuous annealing furnace has an entry section and an exit section, and wherein in addition to the convective heating means, e.g. gas firing means, for heating the annealing furnace to $T_{SET}$ there is provided immediately near the entry section of the continuous annealing furnace a pre-heating device, preferably an induction heating device, and more preferably including a transverse flux induction heating device, enabling an average heat-up rate as function of the sheet thickness of at least Y=−31·ln(X)+50, and with preferred higher heat-up rates, wherein Y is the average heat-up rate in ° C./sec and X is the sheet thickness in mm, in the moving aluminium sheet from ambient temperature to a temperature of 5° C. to 100° C., and preferably of 5° C. to 75° C., below $T_{SET}$.

DESCRIPTION OF THE DRAWINGS

The invention shall now be described with reference to the appended drawings, in which:

FIG. 1 is a schematic representation of the method and the apparatus; and

FIG. 3 is a schematic representation of the required minimum heat-up rate as function of sheet thickness and with preferred embodiments;

FIG. 1 provides a schematic representation of the method and apparatus in accordance with the invention. The continuous annealing furnace (1) is arranged to transport and to heat-treat uncoiled aluminium sheet at final gauge (2) moving in the direction of its length. The aluminium sheet is being uncoiled from coil (8). It moves through the continuous anneal furnace (3) having an entry portion (4) and an exit portion (5). On leaving the exit portion (5) the moving aluminium sheet is rapidly cooled in the cooling section (6) to below about 100° C., e.g. to about room temperature. An industrial continuous annealing furnace represents a substantial capital investment; once commissioned and operational significant modifications such as making it longer in length are often not feasible due to layout constraints on the shop floor.

The moving or travelling aluminium sheet moves substantially horizontally through the continuous annealing furnace over a length of at least about 20 meters, preferably over at least 55 meters. Hot-air nozzles (not shown) throughout the furnace length heat the strip and keep it afloat on an air cushion. Thus, the strip is travelling in a floating state; such a furnace is sometimes also referred to as convection floating furnace. The elimination of mechanical contact at elevated temperature in the annealing furnace translates into a fault-free strip surface. The continuous annealing furnace can be modular in design; as such the furnace comprises several heating zones that use turbines (not shown) to generate an air channel consisting of top and bottom airflows. The air is heated by burners that work preferably with combustion pre-heated air. Temperature control of the set soak temperature is with a control accuracy of +/−3° C. or better.

Figure 2A:
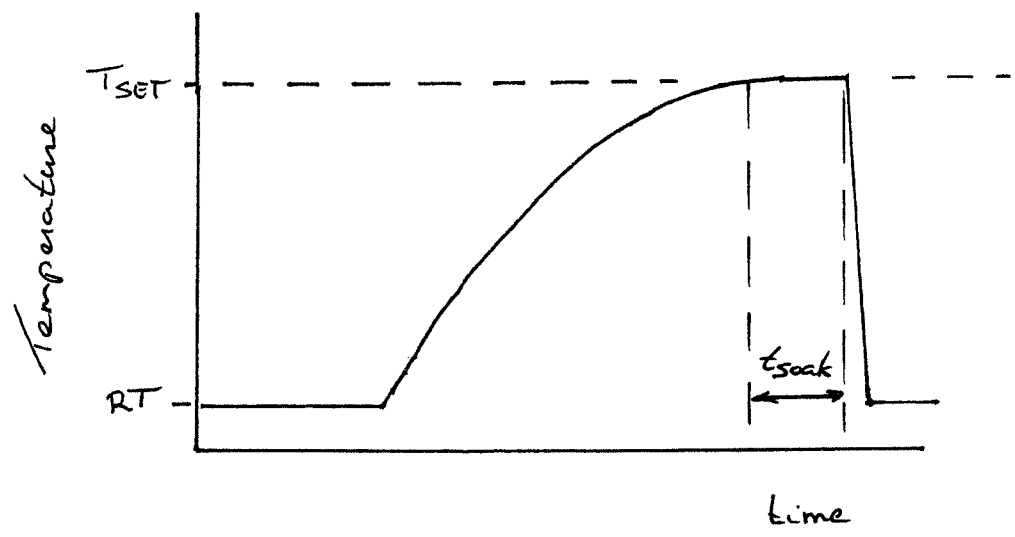
FIGS. 2A and 2B are a schematic representation of a temperature profile as function of the time of aluminium sheet travelling through a continuous annealing furnace according to the state-of-the-art and according to the invention.

The moving sheet (2) enters the entry section (4) at high strip speed or line speed at ambient temperature and is gradually heated-up while travelling through the continuous annealing furnace to a preset solution heat treatment temperature (e.g. about 560° C.) depending on the aluminium alloy. In a conventional continuous annealing furnace the average heat-up rate of the aluminium sheet is typically in a range of about 10-15° C./sec for an about 1 mm sheet material. Depending on the strip speed the strip temperature may reach the actual preset solution heat treatment temperature only far into the second-half of the furnace length or even near the end of the continuous annealing furnace and it is actually soaked at the solution heat treatment temperature for a very short period of time, e.g. a few seconds, whereafter the moving sheet is leaving the annealing furnace at the exit section (5) and is immediately quenched in the cooling section (6). This is also schematically shown in FIG. 2A where the moving aluminium sheet is gradually being heated up from room temperature (RT) to the solution heat treatment temperature ($T_{SET}$) and is soaked for a number of seconds ($t_{SOAK}$) at the set solution heat treatment temperature or set soak temperature. The soaking time ($t_{SOAK}$) is defined at the time spent at the set solution heat treatment temperature or set soaking temperature ($T_{SOAK}$)±5° C.

Depending on the aluminium alloy composition or sheet thickness a longer soaking time at the preset solution heat treatment temperature can be very desirable in order to achieve the desired balance of good roping behaviour and mechanical properties in the T4 condition, but for many AlMgSi alloys this can only be achieved at lower strip speed due to the defined dimensions of the annealing furnace, which makes it economically significantly less attractive where the strip speed or line speed has to be reduced from for example about 60 m/min to about 30 or 40 m/min.

Figure 2B:
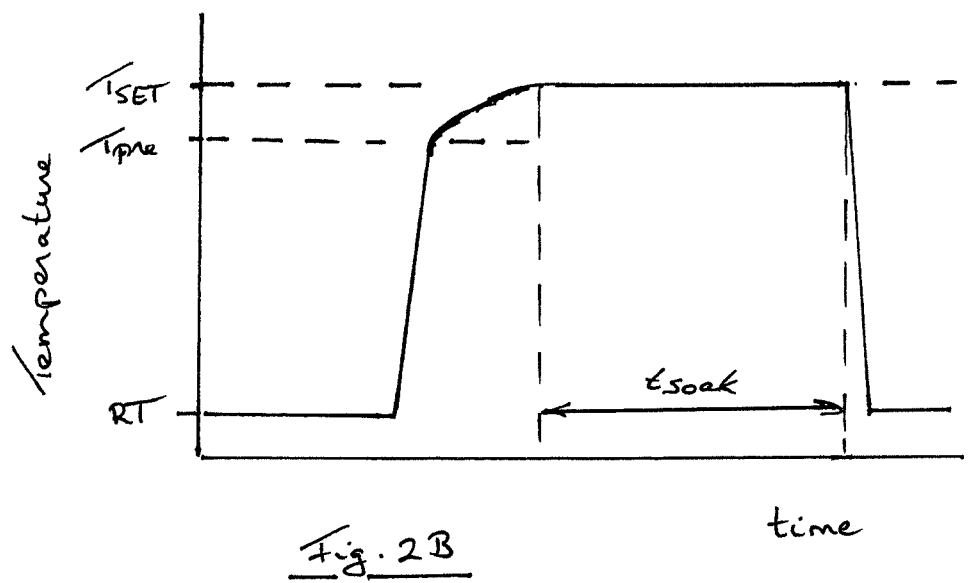

In accordance with the invention, this balance of properties and process economy has been improved by implementing a pre-heating device immediately before the entry section (4) or at the entry section (4) of the annealing furnace. The pre-heat device (7) is arranged to enable a very fast heat-up rate defined by the equation of the heat-up rate as function of the sheet thickness of at least Y=−31·ln(X)+50, wherein Y is the cooling rate in ° C./sec and X is the sheet thickness in mm, and with preferred higher heat-up rates, and which can be achieved for example by means of a transverse flux induction heating device, for example as disclosed in U.S. Pat. No. 5,739,506 (Ajax Magnethermic). It is desirable that the pre-heating of the aluminium sheet in the pre-heating device (7) observes a safety margin to avoid an overshoot in the temperature of the moving strip and thereby adversely affecting relevant engineering properties due to local melting of microstructural components in the aluminium alloy. Preferably the preheat is to a temperature of about 5° C. to 100° C., more preferably of about 5° C. to 75° C., below the preset solution heat treatment temperature or soak temperature at which the heat treatment of the aluminium alloy sheet material should be carried out. Thus for example preheating of the moving aluminium sheet to about 510° C. where the preset solution heat treatment temperature is 555° C. Further heating-up of the moving sheet occurs in the continuous anneal furnace by convective heating. This is also schematically shown in FIG. 2B where the moving aluminium sheet is rapidly pre-heated from room temperature (RT) to the pre-heat temperature ($T_{PRE}$) and then further heated to the set solution heat treatment temperature ($T_{SET}$). The heat-up rate from RT to $T_{PRE}$ will in practice not be exactly linear and for that reason the average heat-up rate is used being the temperature difference between $T_{PRE}$ minus RT divided by the time required to reach $T_{PRE}$; thus for example for 1 mm sheet material when from a room temperature of 25° C. a $T_{PRE}$ of about 500° C. is reached in about 5 sec, the average heat-up rate is about 95° C./sec. This allows, compared to the situation where there is no rapid pre-heating applied, a significantly longer soaking time at the set solution heat treatment temperature while maintaining about the same strip speed. Alternatively, it allows for a significantly increased line speed while having an about the same soaking time ($t_{SOAK}$) compared to the state-of-the art situation. Thus for a given continuous annealing furnace, depending on the specific AlMgSi alloy there is now significantly more flexibility in optimising soaking time in combination with the line speed in order to arrive at an improved balance of process economy and sheet properties.

By the method according to the invention and the use of the corresponding apparatus also thicker gauge sheet material can be processed at relative high strip speeds. Where for example a 1 mm sheet material can be processed with line speeds of up to about 70 m/min, a 2 mm sheet material of the same alloy can be processed only with a line speed of up to about 35 m/min due to the significantly longer heat-up time when heated in a convection furnace. With the method and apparatus according to the invention wherein the sheet material is preheated very rapidly to about 510° C. and the solution heat treatment temperature is about 560° C. the 2 mm sheet material can now be continuously heat treated at significantly higher line speeds in the range about 55 to 65 m/min while having an about similar $t_{SOAK}$ as the 1 mm sheet material.

FIG. 3 is a schematic representation of the required minimum average heat-up rate as function of the sheet thickness (line 1) and with preferred embodiments (lines 2-4) for the method according to this invention and also for the apparatus and kit-of-parts. The relationship is shown for sheet gauges in the preferred gauge range of 0.3 to 4.5 mm. For lines 1 to 4 the following natural logarithmic equations apply:

$$Y=-31\cdot\ln(X)+50; \quad \text{Line 1:}$$

$$Y=-50\cdot\ln(X)+80; \quad \text{Line 2:}$$

$$Y=-62\cdot\ln(X)+100; \quad \text{Line 3:}$$

$$Y=-93\cdot\ln(X)+150; \quad \text{Line 4:}$$

and wherein "Y" represents the average heat-up rate in ° C./sec and "X" represents the sheet thickness in mm.

The invention will now be illustrated with reference to non-limiting examples according to the invention.

Example 1

Cold rolled AA6016 sheet material of 1.1 mm gauge has been manufactured via DC-casting, preheating, hot rolling to 7.5 mm, cold rolling to 1.1 mm with an inter-anneal at 400° C., and then further processed via solution heat treating at about 560° C. in a convection floating furnace at several line speeds followed by quenching. The yield strength and tensile strength have been tested after 17 days natural ageing (T4 condition) at about 25° C. A second series of the same material has been tested after a simulated paint-bake cycle (2% pre-stain+185° C.@20 min). Tensile testing has been done in the LT direction and performed in accordance with testing standard EN-10002 "Metallic materials—tensile testing—part 1: Method of testing at ambient temperature." The results are listed in Table 1. In addition it appeared that for all processing routes applied the resultant aluminium sheet had still a very good roping performance following visual inspection after applying a 15% pre-strain on a 100×300 mm sample perpendicular to the rolling direction and subsequent grinding with sand paper.

TABLE 1

| Line speed [m/min] | T4 + 17 days natural ageing | | | T4 + simulated paint-bake | | |
| --- | --- | --- | --- | --- | --- | --- |
| | Rp0.2 [N/mm²] | Rm [N/mm²] | A80 [%] | Rp0.2 [N/mm²] | Rm [N/mm²] | A80 [%] |
| 60 | 84 | 191 | 24 | 170 | 237 | 21 |
| 40 | 105 | 222 | 25 | 203 | 269 | 21 |
| 30 | 112 | 232 | 26 | 213 | 280 | 20 |

From the results of Table 1 it can be seen that there is a strong influence of the line speed in the convection floating furnace on the properties of the aluminium sheet both in the T4 temper and after a simulated paint-bake cycle. The trend is that with increasing line speed the relevant properties like yield strength and tensile strength decrease with increasing line speed. Depending of the alloy quality there are also customer requirement when supplying coils of material in for example a T4 condition with some days of natural ageing or a T4 condition with a pre-bake. A usual customer requirement is that in the T4 condition the yield strength should be at least 90 MPa, the tensile strength should be at least 190 MPa. In addition there are requirements of the mechanical properties after a simulated paint-bake cycle of 2% pre-strain and 185° C.@20 min, such as a yield strength of at least 200 MPa. This may have a strong effect on the economics of the applied heat treatment process as a lower line speed means in a continuous process whereby multiple coils of the same alloy are processed behind each other a lower line speeds and thereby lower throughput per time unit. For example this means that for the example at hand a high line speed of for example 60 m/min provides a material that does not meet customer requirements, whereas a line speed of 40 m/min just meets the required lower limit of the yield strength after a paint-bake cycle, and consequently the sheet material will have to be processed at significantly lower and economical less attractive line speeds.

However, in accordance with the invention it has been found that when using a rapid pre-heat, for example of average about 150° C./sec, a favorable longer soaking time at the set solution heat treatment temperature can be obtained while maintaining about the same line speed, and thereby providing an aluminium sheet having increased mechanical properties, in particular also after a paint-bake cycle. Alternatively, it allows for a significantly increased line speed, e.g. working at 60 m/min, while having about the same soaking time ($t_{SOAK}$) compared to the situation without a rapid pre-heat. Thereby providing an aluminium sheet having similar mechanical properties to those obtained without rapid pre-heating on a line speed of about 40 m/min, allowing a manufacturing at an economical more attractive line speed. While a high degree of roping performance is being maintained by the method according to this invention.

Example 2

AA6005A sheet material of 2.5 mm gauge in the T4 condition has been produced via two routes and tested in a dynamic crash test. The first route included manufacturing via solution heat treating at 550° C. in a convection floating furnace followed by quenching. The second route was similar as the first route, but was preceded by a rapid heat-up via inductive heating from room temperature to about 490° C. using an average heat-up rate of about 65° C./sec.

Figure 4:
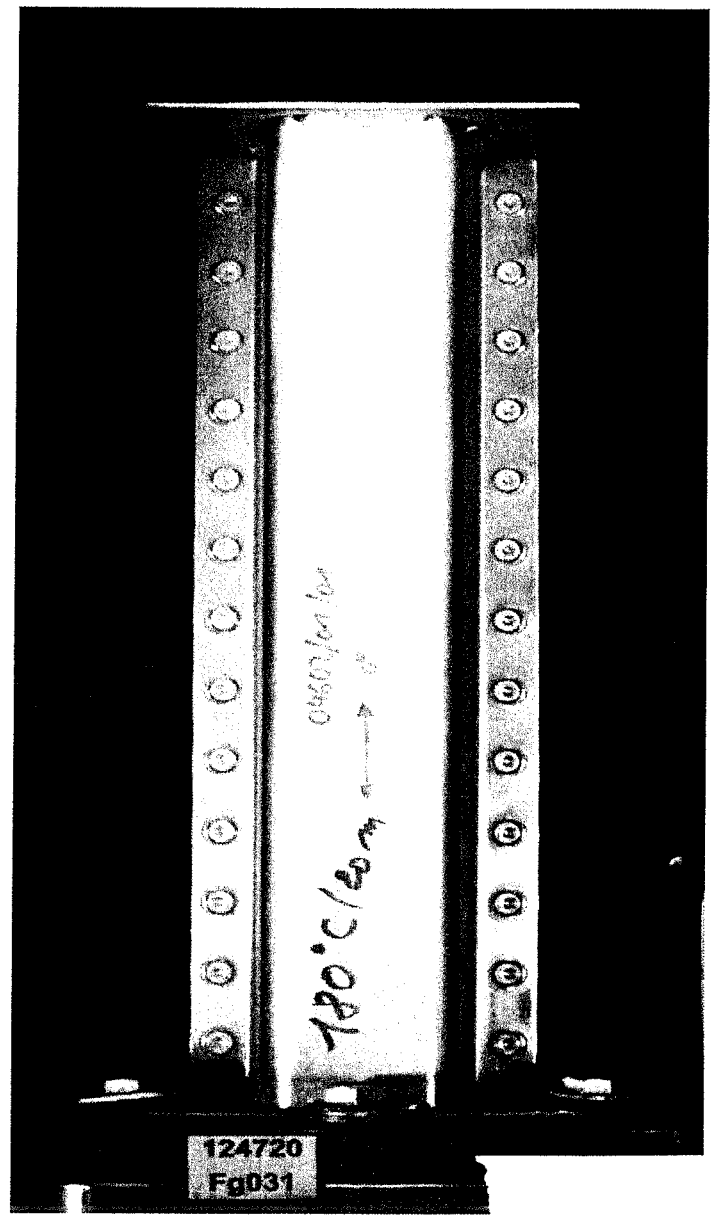
FIG. 4 is a photograph of a typical axial folding crash box configuration for use in a dynamic crash test.

FIG. 4 shows a photograph of a typical axial folding crash box configuration as known in the art for use in a dynamic crash test.

The hollow crash box is made of the 2.5 mm gauge aluminium sheet bend in a U-shape having a length of 400 mm and a flat back cover sheet of 2.5 mm made from the same material. Both are joined by means of riveting using 13 rivets on either side of the U-shape and distanced 30 mm from each other. The height of the U-shape is 90 mm and the width of the flat top of the U-shape is 64 mm; there is an 87° angle between the flat back cover sheet and the 90 mm standing web of the crash box. Two flat cover plates (120× 140 mm provided with a centre hole of 40 mm diameter) made from the same aluminium sheet material are welded to the box at the bottom and the top. The whole box is subjected to a simulated paintcycle of 180° C.@20 min. After that the crash box is placed in a drop tower test bench, where a guided drop weight of 250 kg is released from a height of 4.25 meters, resulting in impacting the crash box at a speed of about 35 km/h. During the impact the crash box absorbs the kinetic energy and deforms plastically by folding. Failure of the crash box is amongst others detected by recording the moment of the formation of the first crack by using high-speed camera film.

The alloy manufactured via route 1 had a time-to-first-crack of 3.5 msec in the axial direction, whereas the alloy manufactured via route 2 had a time-to-first-crack of 6.3 msec in the same testing direction.

This example illustrates that for AlMgSi-series alloys for which the crash performance is an important material property that the sheet material manufactured via the method according to this invention results an almost double time-to-first-crack in a dynamic crash test. This means a very significant improvement of the ability of a component manufactured with a material produced according to the invention to absorb kinetic energy in case of a crash as compared to a component manufactured with material of the same composition and gauge produced according to route 1.

While various embodiments of the technology described herein have been described in detail, it is apparent that modifications and adaptations of those embodiments will occur to those skilled in the art.

The invention claimed is:

1. A method for continuously annealing aluminium alloy sheet at final thickness, comprising:
   continuously moving uncoiled heat-treatable AlMgSi aluminum alloy sheet, having a sheet thickness, in the direction of its length through a continuous annealing furnace arranged to heat the moving aluminium sheet to a set soaking temperature (TSET) in a temperature range of 500° C. to 590° C., the continuous annealing furnace has an entry section and an exit section, wherein the moving aluminium sheet moves substantially horizontally through the continuous annealing furnace,
   wherein the continuous annealing furnace is heated by convective heating, and
   wherein the moving aluminium sheet is rapidly cooled from TSET to below about 100° C. on leaving the exit section, and
   wherein before or near the entry section of the continuous annealing furnace the moving aluminium sheet is pre-heated to a temperature of 5° C. to 100° C. below the TSET using an average heat-up rate as function of the sheet thickness of at least $Y=-31\cdot\ln(X)+50$, wherein "Y" is the heat-up rate in ° C./sec and "X" is the sheet thickness in mm.

2. The method according to claim 1, wherein before or at the entry section of the continuous annealing furnace the moving aluminium sheet is pre-heated to a temperature of 5° C. to 100° C. below the TSET using an average heat-up rate as function of the sheet thickness of at least $Y=-50\cdot\ln(X)+80$, and more preferably of at least $Y=-62\cdot\ln(X)+100$, wherein Y is the heat-up rate in ° C./sec and X is the sheet thickness in mm.

3. The method according to claim 1, wherein the pre-heating is per-formed inductively by induction heating.

4. The method according to claim 1, wherein the pre-heating is done inductively by a transverse flux induction heating device.

5. The method according to claim 1, wherein the aluminium alloy sheet at final gauge has a thickness in a range of 0.3 to 4.5 mm.

6. The method according to claim 1, wherein the moving aluminium sheet moves substantially horizontally through the continuous annealing furnace over a length of at least 20 meters.

7. The method according to claim 1, wherein a soaking time of the moving aluminium sheet at TSET is at least 1 seconds.

8. The method according to claim 1, wherein the moving aluminium sheet is pre-heated to a temperature of 5° C. to 75° C. below the TSET.

9. The method according to claim 1, wherein the moving aluminium sheet is pre-heated to a temperature of 10° C. to 100° C. below the TSET.

10. The method according to claim 1, wherein the continuous annealing furnace is arranged to heat the moving aluminium sheet to a set soaking temperature (TSET) in a temperature range of 520° C. to 580° C.

11. The method according to claim 1, wherein the moving aluminium sheet is rapidly cooled or quenched after leaving the exit section and is stretched up to 2%, by tension levelling.

12. The method according to claim 11, wherein the stretched and moving aluminium sheet is subsequently cleaned and provided with a passivation coating.

13. The method according to claim 12, wherein the stretched aluminium sheet having a passivation coating is heated-treated in a pre-bake heat treatment.

14. The method according to claim 1, wherein convective heating of the continuous annealing furnace is gas fired.

15. The method according to claim 1, wherein the aluminium alloy sheet at final gauge has a thickness in the range of 0.7 to 4.5 mm.

16. The method according to claim 1, wherein the moving aluminium sheet moves substantially horizontally through the continuous annealing furnace over a length of at least 40 meters.

17. The method according to claim 1, wherein a soaking time of the moving aluminium sheet at TSET is at least 5 seconds.

18. The method according to claim 1, wherein a soaking time of the moving aluminium sheet at TSET is at least 20 seconds.

19. The method according to claim 1, wherein the moving aluminium sheet is pre-heated to a temperature of 5° C. to 60° C. below the TSET.

20. The method according to claim 1, wherein the moving aluminium sheet is pre-heated to a temperature of 10° C. to 75° C. below the TSET.

21. The method according to claim 1, wherein the moving aluminium sheet is pre-heated to a temperature of 10° C. to 60° C. below the TSET.

22. The method according to claim 1, wherein the moving aluminium sheet is rapidly cooled or quenched after leaving the exit section and is stretched in a range of 0.1% to 0.3%, by tension levelling.

\* \* \* \* \*